(12) United States Patent
Poliquin

(10) Patent No.: US 9,157,569 B2
(45) Date of Patent: Oct. 13, 2015

(54) REMOTE CONTROLLED MOVING PLATFORM FOR A CAMERA

(71) Applicant: Yves Poliquin, Saint-Jerome (CA)

(72) Inventor: Yves Poliquin, Saint-Jerome (CA)

(73) Assignee: POLYCOM DESIGN INC., Saint Jerome (CA)

( * ) Notice: Subject to any disclaimer, the term of this patent is extended or adjusted under 35 U.S.C. 154(b) by 234 days.

(21) Appl. No.: 14/054,870

(22) Filed: Oct. 16, 2013

(65) Prior Publication Data

US 2015/0102198 A1 Apr. 16, 2015

(30) Foreign Application Priority Data

Oct. 16, 2012 (GB) .................................. 1218583.1

(51) Int. Cl.

| | |
|---|---|
| *F16M 13/00* | (2006.01) |
| *F16M 11/42* | (2006.01) |
| *F16M 11/18* | (2006.01) |
| *H04N 5/225* | (2006.01) |
| *F16M 11/28* | (2006.01) |

(52) U.S. Cl.
CPC ............. *F16M 11/425* (2013.01); *F16M 11/18* (2013.01); *F16M 11/28* (2013.01); *H04N 5/2252* (2013.01)

(58) Field of Classification Search
CPC ..... F16M 11/425; F16M 11/18; F16M 11/28; F16M 11/42; F16M 11/2021; H04N 5/2252; A63H 18/00; A63H 18/10; G03B 17/56
See application file for complete search history.

(56) References Cited

U.S. PATENT DOCUMENTS

| | | | |
|---|---|---|---|
| 2,254,153 | A | 8/1941 | Larrabee |
| 2,348,841 | A | 5/1944 | Oswald |
| 2,387,859 | A | 10/1945 | Schmidt |
| 2,821,938 | A | 2/1958 | Müller |
| 3,027,682 | A | 4/1962 | Schlau |
| 3,206,122 | A | 9/1965 | Frisbie et al. |
| 3,584,410 | A | 6/1971 | Lalonde |
| 4,352,329 | A | 10/1982 | Fetty et al. |
| 4,549,208 | A | 10/1985 | Hamejima et al. |
| D287,608 | S | 1/1987 | Petersson |
| 4,709,265 | A | 11/1987 | Silverman et al. |
| D345,997 | S | 4/1994 | Vadnal |
| 5,497,188 | A | 3/1996 | Kaye |
| 7,012,637 | B1 | 3/2006 | Blume |
| 2005/0231689 | A1* | 10/2005 | Longley .................. 352/243 |
| 2009/0309986 | A1* | 12/2009 | Mayer .................... 348/208.99 |

FOREIGN PATENT DOCUMENTS

| | | |
|---|---|---|
| DE | 1076003 | 2/1960 |
| EP | 0222518 | 5/1987 |
| GB | 708187 | 4/1954 |
| WO | WO2006017945 | 2/2006 |

* cited by examiner

*Primary Examiner* — Brian D Mattei
(74) *Attorney, Agent, or Firm* — McDonnell Boehnen Hulbert & Berghoff LLP

(57) ABSTRACT

A moving platform for use with a camera and track assembly, and comprising a platform body having a hollow rectangular shape with five mirrored exterior sides and one open bottom side. Within and attached to the platform body is a drive wheel, an electric motor and a gear box adapted to drive the drive wheel, a non-drive wheel positioned and rotatable parallel to the drive wheel, a pair of directional wheels spaced from the drive wheel and the non-drive wheel, and a guide wheel assembly attached between the pair of directional wheels and including at least one caster wheel assembly adapted to roll within a recessed rail of a track assembly.

18 Claims, 6 Drawing Sheets

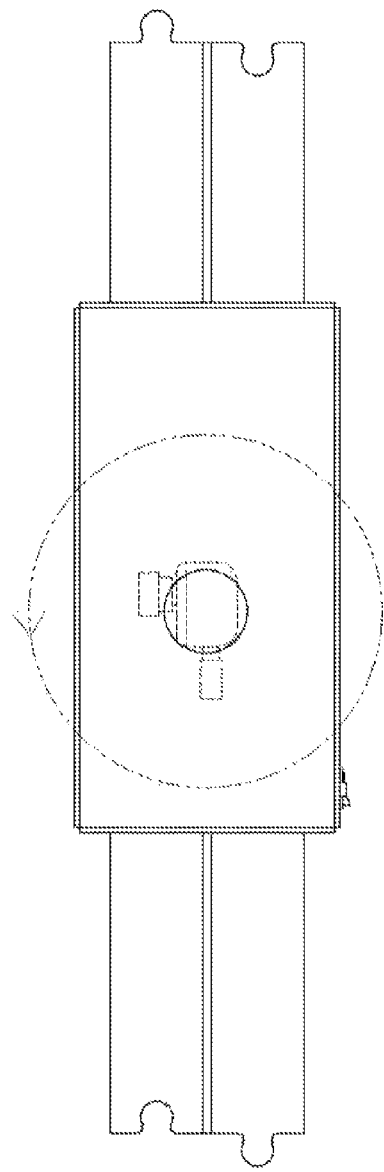
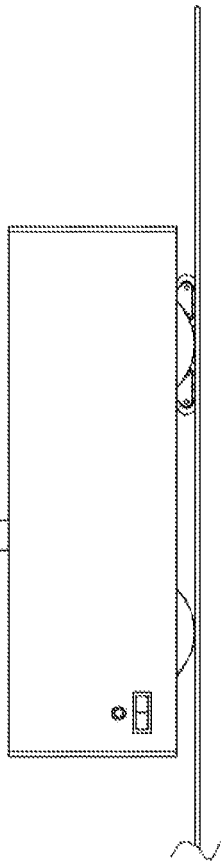
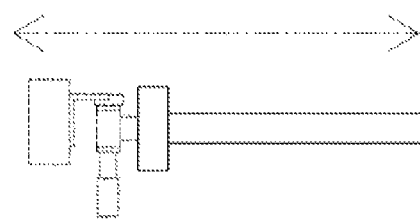
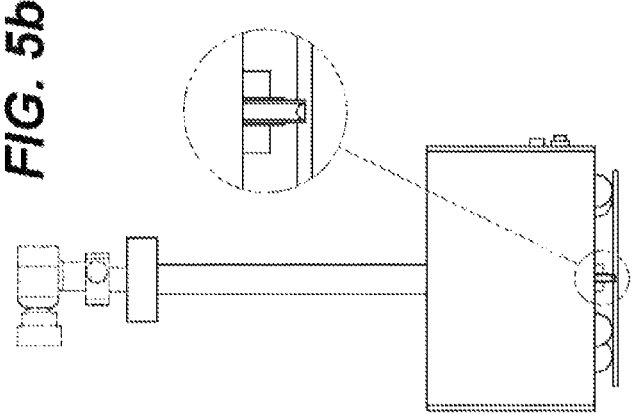
FIG. 5a
FIG. 5b
FIG. 5c
FIG. 5d

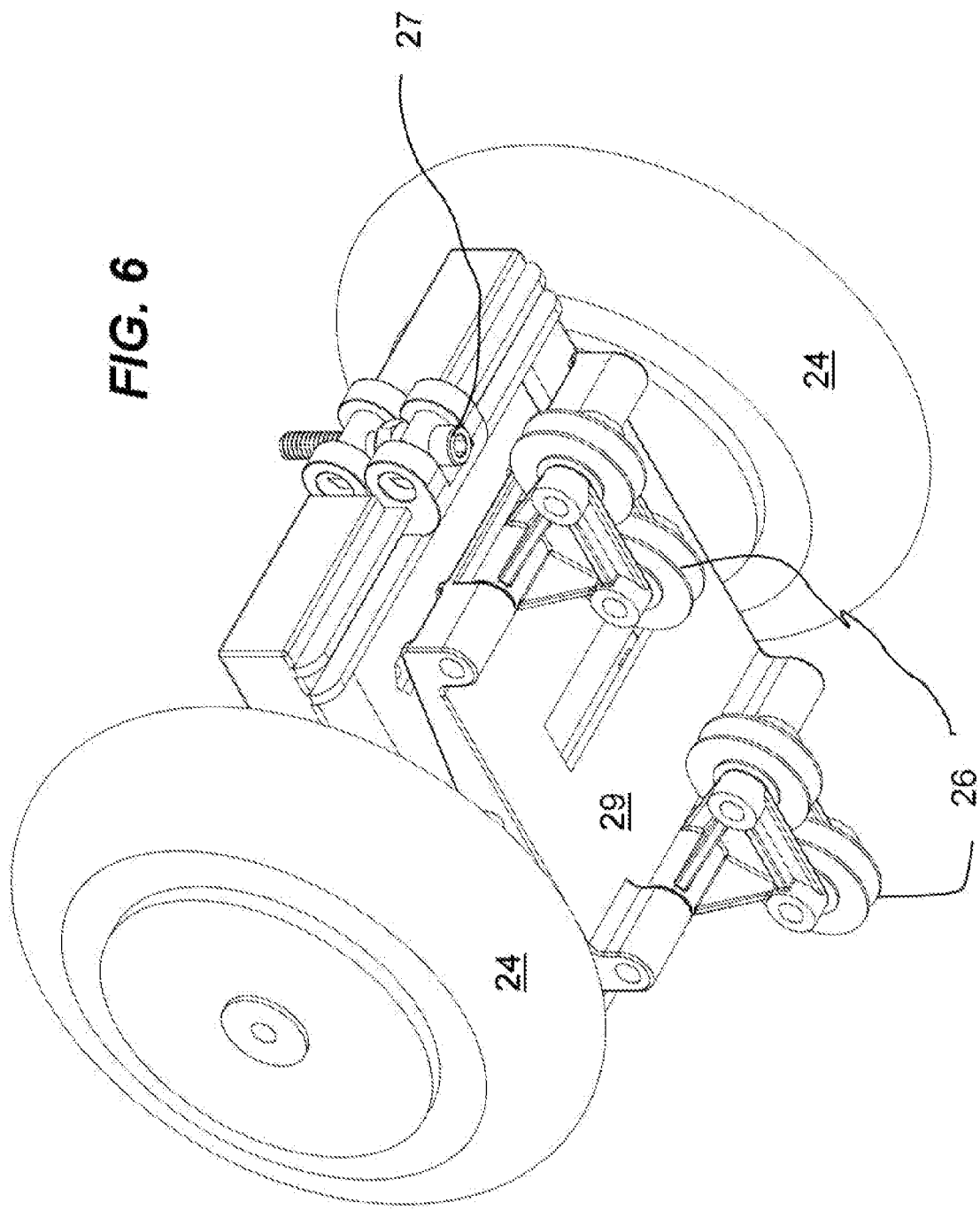

REMOTE CONTROLLED MOVING PLATFORM FOR A CAMERA

This application claims priority based on request GB1218583.1 filed Oct. 16, 2012

FIELD OF THE INVENTION

The present invention relates generally to camera equipment but more particularly to a remote controlled moving platform for a camera.

BACKGROUND OF THE INVENTION

Motion controlled cameras as well as remote controlled camera platforms have been used for decades in the motion picture industry. More recently, with the increased popularity of amateur video, some types of equipment have been made available to amateur film makers.

A common problem found by film makers everywhere is that the camera, its platform and the cameraman himself can be reflected in the subject being filmed. Mirrors are sometimes used to reflect the surrounding environment and thus hide the camera from view. Also, the use of a remote controlled camera that eliminates the presence of a cameraman next to the camera also helps in considerably reducing the visibility in the subject being filmed. Typically, such methods of combining mirrors and remote controlled camera platforms are customized for the job and remain the purview of professional film makers. There is a need for a practical and economical way of providing such advantages to the amateur film maker market.

SUMMARY OF THE INVENTION

In view of the foregoing disadvantages inherent in the known devices now present in the prior art, the present invention, which will be described subsequently in greater detail, is to provide objects and advantages which are:

To provide for a practical and economical way of providing a remote controlled moving platform for a camera to the consumers market.

In order to do so, the invention consists in a moving platform for use with a camera and track assembly, and comprising a platform body having a hollow rectangular shape with five mirrored exterior sides and one open bottom side. Within and attached to the platform body is a drive wheel, an electric motor and a gear box adapted to drive the drive wheel, a non-drive wheel positioned and rotatable parallel to the drive wheel, a pair of directional wheels spaced from the drive wheel and the non-drive wheel, and a guide wheel assembly attached between the pair of directional wheels and including at least one caster wheel assembly adapted to roll within a recessed rail of a track assembly.

The moving platform also has a monopod extending upwards from a top mirrored exterior side of the five mirrored exterior sides, and a tilt and pan head member attached to a distal end of the monopod and adapted to releasably connect and adjustably move the camera thereon, such that the moving platform is adapted to adjustably move the camera around a configuration of the track assembly.

The platform body defines a center line along a length thereof that is adapted to be in line with a center line of a track member of a track assembly, and wherein a center point between the drive wheel and the non-drive wheel is positioned offset from the center line of the platform body a chosen distance, and wherein a center point between the pair of directional wheels is positioned at the center line of the platform body, such that the moving platform is adapted to move more efficiently around a circular or elliptical track.

The attachment between the at least one caster wheel assembly and the platform body is adjusted by an adjustment screw, such that the distance that the at least one caster wheel assembly can extend outwardly and below the platform body can be adjusted to properly fit within a recessed rail of a chosen track assembly.

The platform body further includes an electric controller electronically connected to the electric motor and adapted to receive electronic signals from a remote control device, thereby capable of controlling the movements of the moving platform remotely.

The monopod is releasably connected to the top mirrored exterior side of the five mirrored exterior sides by an anchor member located inside the platform body and under the top mirrored exterior side.

The monopod is formed as a telescoping pole, such that the height of the monopod can be adjusted.

The guide wheel assembly includes two spaced caster wheel assemblies connected thereon in a linear configuration, such that both the caster wheel assemblies are adapted to roll within the same recessed rail of a track assembly.

The invention works as a combination of a camera member, a moving platform, and a track assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIGS. 5a-d Top, front, front detail, and side views, respectively, of the invention.

FIG. 6 Isometric view of the guiding wheels assembly.

DETAILED DESCRIPTION OF THE PREFERRED EMBODIMENT

Figure 1:
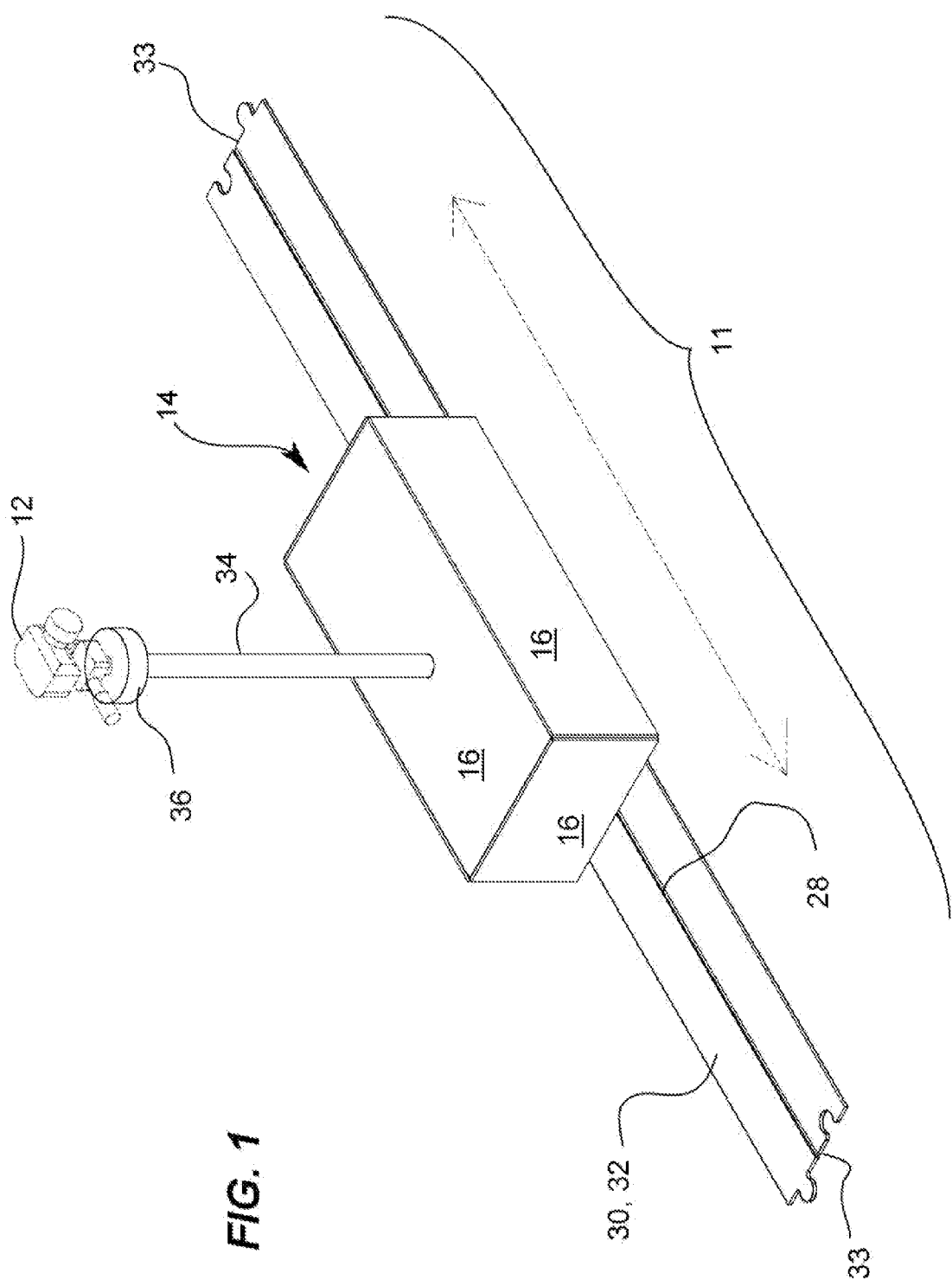
FIG. 1 Isometric view of the invention.
Figure 2:
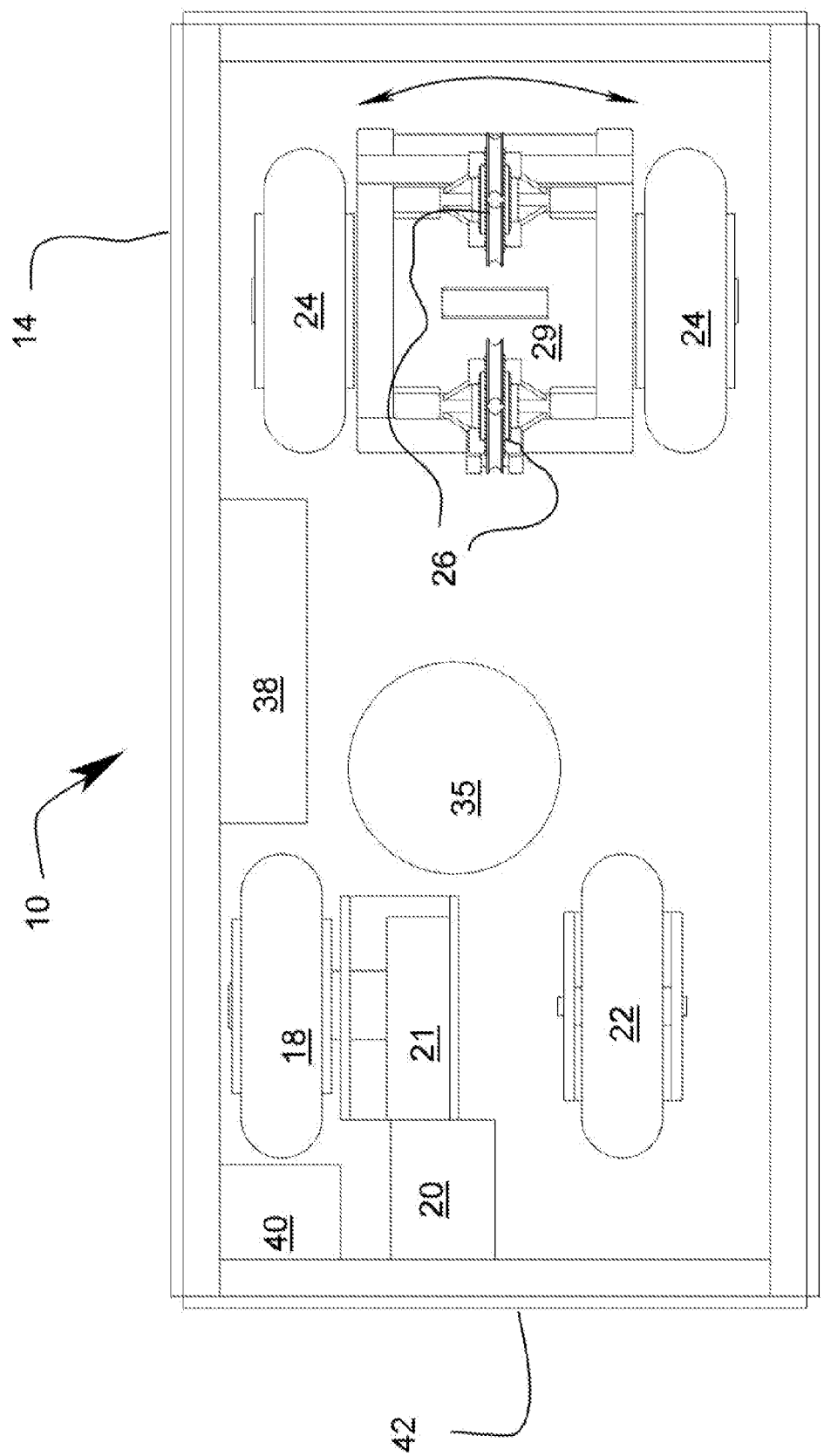
FIG. 2 Bottom view of the invention.
Figure 3:
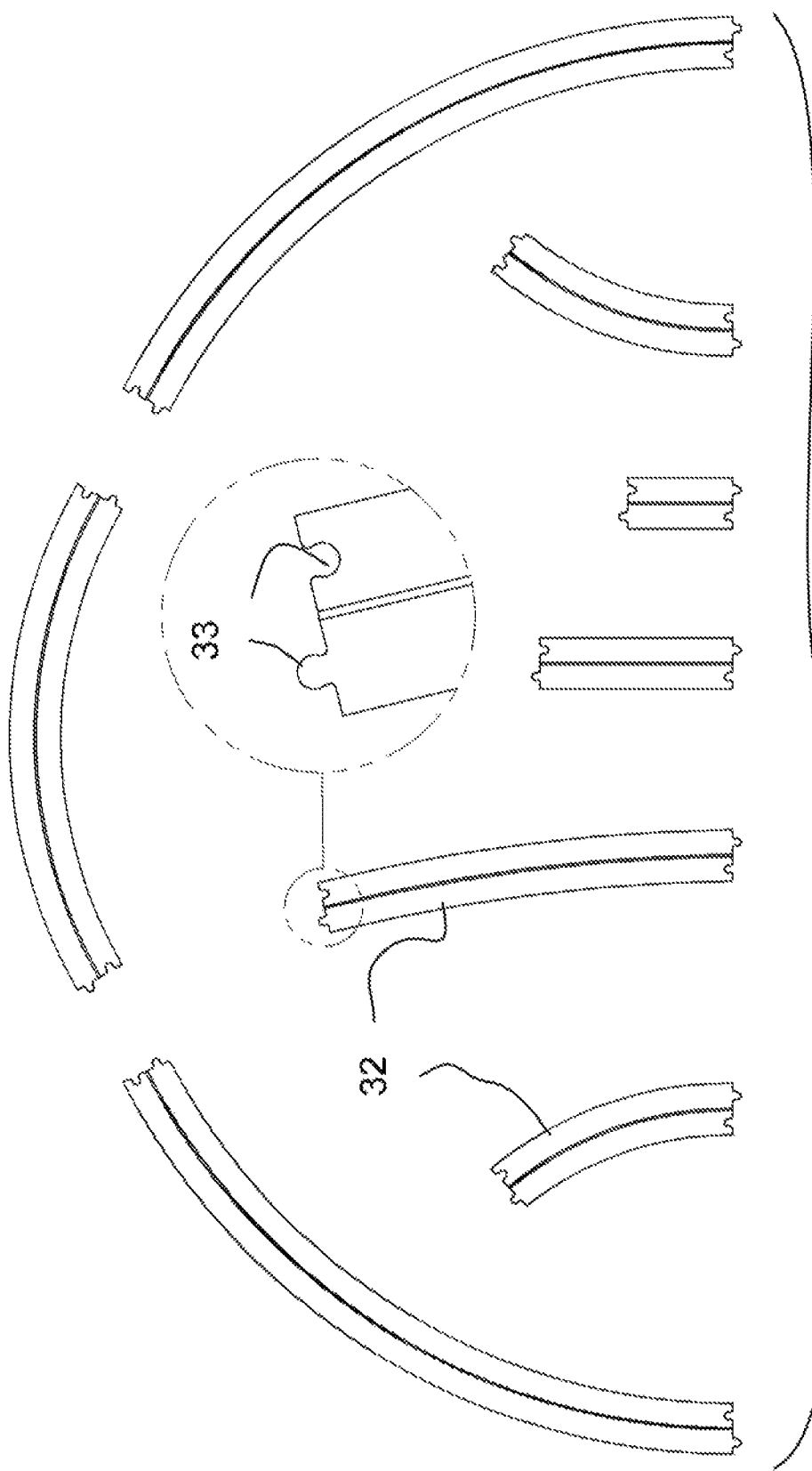
FIG. 3 Top view of track sections.
Figure 4:
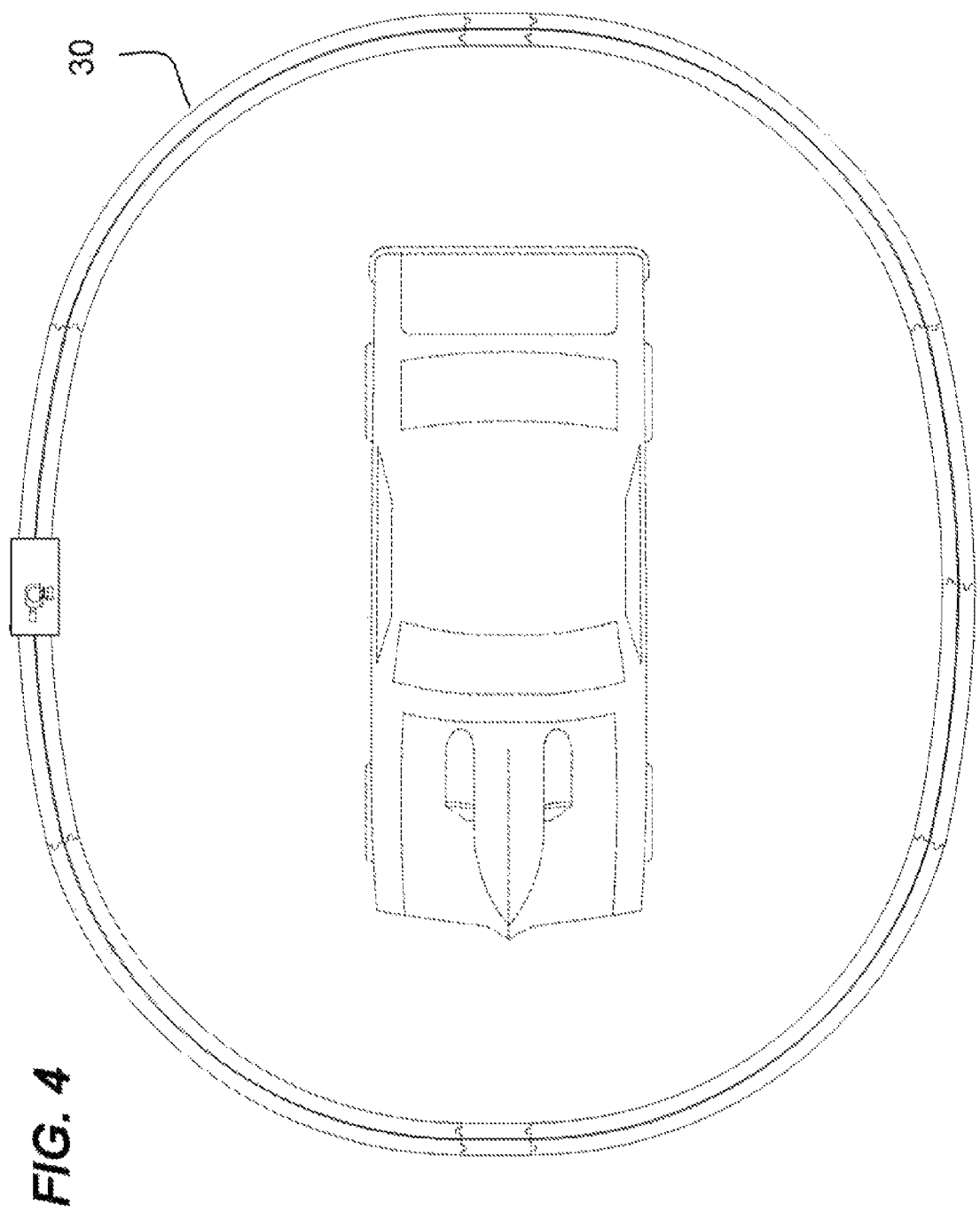
FIG. 4 Top view of a track and the platform in context of use.

A remote controlled moving platform (10) for a camera member (12) has a platform body (14) having five mirrored surfaces (16). The body (14) has a drive wheel (18) driven by an electric motor (20) and a non-drive wheel (22) running parallel to the drive wheel (18). A gear box (21) interfaces between the electric motor (20) and the drive wheel (18). Directional wheels (24) are located at an opposite end of the body (14) in relations to the wheels (18, 22). Because the normal path is a substantially ellipsoid path, it is best suited that the drive wheels (18, 22) be somewhat off centered in relation to the body (14), as seen in FIG. 2.

At least one guide wheel assembly (26) comprising a caster wheel assembly is configured for following a recessed rail (28) forming part of a transparent track (30). The track (30) consists in a plurality of track sections (32) having different lengths and curvatures so that each section (32) can be interlocked with other sections (32), by way of male-female interlocking members (33), in order to create a path. An adjustment screw (27) controls the depth the caster (26) goes into the rail (28). The caster wheel assembly (26) is connected to a guiding wheels assembly (29) which, by rotating, changes the direction of the directional wheels (24).

A transparent monopod (34) is located atop the body (14) and supports a tilt and pan head (36) for the camera (12). The monopod (34) is connected to the body (14) by way of an anchor member (35) located inside, just under the top mirrored surface (16).

Other components are standard electrical and electronic components required for making the electric motor (20) work such as a 6V battery (38), an electric controller (40) for the remote operation and voltage regulation and battery recharging. A hatch (42) allows for easy accessibility to some components not accessible from the bottom.

Additionally, a more sophisticated moving platform (10) could have motion control capabilities by incorporating stepper motors to record and repeat every movement of the body (14) as well as other movements such as a telescoping monopod (34) for example or a driven tilt and pan head (36). Thus equipped, even the most sophisticated visual effects could be realized by amateur film makers.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A moving platform for use with a camera and track assembly, said moving platform comprising a platform body having a hollow rectangular shape with five mirrored exterior sides and one open bottom side, and within and attached to said platform body includes a drive wheel, an electric motor and a gear box adapted to drive said drive wheel, a non-drive wheel positioned and rotatable parallel to said drive wheel, a pair of directional wheels spaced from said drive wheel and said non-drive wheel, and a guide wheel assembly attached between said pair of directional wheels and including at least one caster wheel assembly adapted to roll within a recessed rail of a track assembly; said moving platform further comprising a monopod extending upwards from a top mirrored exterior side of said five mirrored exterior sides, and a tilt and pan head member attached to a distal end of said monopod and adapted to releasably connect and adjustably move said camera thereon, such that said moving platform is adapted to adjustably move said camera around a configuration of said track assembly.

2. The moving platform of claim 1, wherein said platform body defines a center line along a length thereof that is adapted to be in line with a center line of a track member of a track assembly, and wherein a center point between said drive wheel and said non-drive wheel is positioned offset from said center line of said platform body a chosen distance, and wherein a center point between said pair of directional wheels is positioned at the center line of said platform body, such that said moving platform is adapted to move more efficiently around a circular or elliptical track.

3. The moving platform of claim 1, wherein the attachment between said at least one caster wheel assembly and said platform body is adjusted by an adjustment screw, such that the distance that said at least one caster wheel assembly can extend outwardly and below said platform body can be adjusted to properly fit within a recessed rail of a chosen track assembly.

4. The moving platform of claim 1, wherein said platform body further including an electric controller electronically connected to said electric motor and adapted to receive electronic signals from a remote control device, thereby capable of controlling the movements of said moving platform remotely.

5. The moving platform of claim 1, wherein said monopod is releasably connected to said top mirrored exterior side of said five mirrored exterior sides by an anchor member located inside said platform body and under said top mirrored exterior side.

6. The moving platform of claim 1, wherein said monopod is formed as a telescoping pole, such that said height of said monopod can be adjusted.

7. The moving platform of claim 1, wherein said guide wheel assembly includes two spaced caster wheel assemblies connected thereon in a linear configuration, such that both said caster wheel assemblies are adapted to roll within the same recessed rail of a track assembly.

8. A moving camera assembly comprising;
a camera member;
a moving platform; and
a track assembly;
wherein said moving platform comprises a platform body having a hollow rectangular shape with five mirrored exterior sides and one open bottom side, and within and attached to said platform body includes a drive wheel, electric motor and a gear box adapted to drive said drive wheel, a non-drive wheel positioned and rotatable parallel to said drive wheel, a pair of directional wheels spaced from said drive wheel and said non-drive wheel, and a guide wheel assembly attached between said pair of directional wheels and including at least one caster wheel assembly adapted to roll within a recessed rail of said track assembly; said moving platform further comprising a monopod extending upwards from a top mirrored exterior side of said five mirrored exterior sides, and a tilt and pan head member attached to a distal end of said monopod and adapted to releasably connect and adjustably move said camera thereon, such that said moving platform is adapted to adjustably move said camera around a configuration of said track assembly and wherein said platform body can move along and follow said track assembly as desired;

and wherein said track assembly includes a plurality of track members interconnected to form a continuous track, each said track member including a recessed rail therein extending the length thereof, such that said at least one caster wheel assembly can ride within said recessed rails and keep said moving platform in proper position around said track assembly.

9. The moving platform of claim 8, wherein said platform body defines a center line along a length thereof that is adapted to be in line with a center line of each track member of said track assembly, and wherein a center point between said drive wheel and said non-drive wheel is positioned offset from said center line of said platform body a chosen distance, and wherein a center point between said pair of directional wheels is positioned at the center line of said platform body, such that said drive wheel and said non-drive wheel are offset from said pair of directional wheels, such that said moving platform is adapted to move more efficiently around a circular or elliptical configuration of said track assembly.

10. The moving platform of claim 8, wherein the attachment between said at least one caster wheel assembly and said platform body is adjusted by an adjustment screw, such that the distance that said at least one caster wheel assembly can extend outwardly and below said platform body can be adjusted to properly fit within said recessed rail of said track members.

11. The moving platform of claim 8, wherein said platform body further including an electric controller electronically connected to said electric motor and adapted to receive electronic signals from a remote control device, thereby capable of controlling the movements of said moving platform remotely.

12. The moving platform of claim 8, wherein said monopod is releasably connected to said top mirrored exterior side of said five mirrored exterior sides by an anchor member located inside said platform body and under said top mirrored exterior side.

13. The moving platform of claim 8, wherein said monopod is formed as a telescoping pole, such that said height of said monopod can be adjusted.

14. The moving platform of claim 8, wherein said guide wheel assembly includes two spaced caster wheel assemblies connected thereon in a linear configuration, such that both said caster wheel assemblies are adapted to roll within the same recessed rail of each track member.

15. The moving platform of claim 8, wherein each said track member has a male and female interlocking connector portion on each end, such that adjacent track members can be easily releasably connected to one another.

16. The moving platform of claim 8, wherein said continuous track is formed in a shape chosen from a list of shapes comprising circular and elliptical.

17. The moving platform of claim 8, wherein said monopod and said plurality of track members are formed from a transparent material.

18. The moving platform of claim 8, wherein each said track member can have differing shapes, curvatures, and lengths from one another.

* * * * *